UNITED STATES PATENT OFFICE.

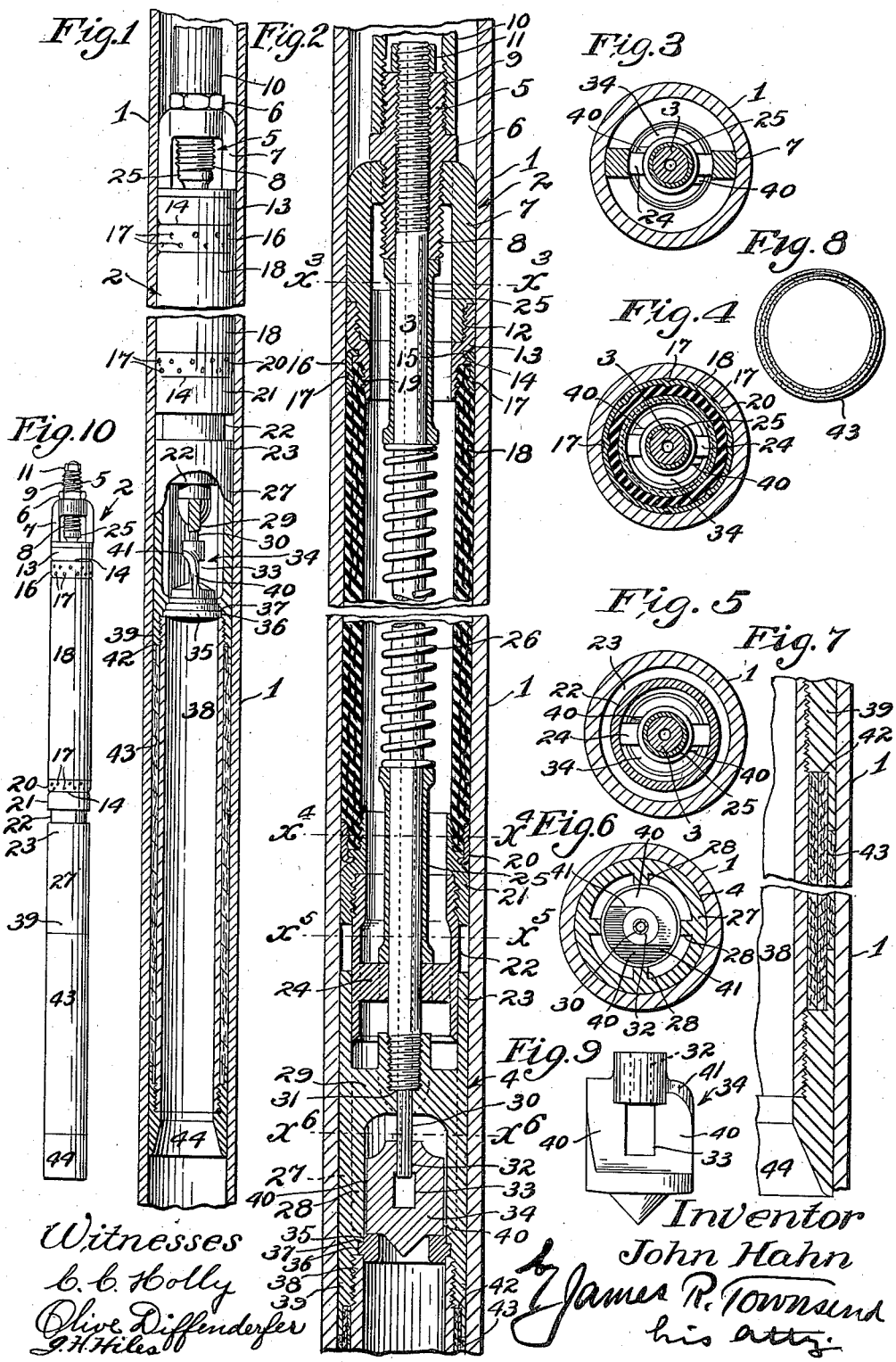
J. HAHN.
FLUID PACKING PUMP PISTON.
APPLICATION FILED JAN. 4, 1911.
1,024,130.
Patented Apr. 23, 1912.

JOHN HAHN, OF LOS ANGELES, CALIFORNIA.

FLUID-PACKING PUMP-PISTON.

1,024,130.  Specification of Letters Patent.  Patented Apr. 23, 1912.

Application filed January 4, 1911. Serial No. 600,821.

*To all whom it may concern:*

Be it known that I, JOHN HAHN, a citizen of the United States, residing at Los Angeles, in the county of Los Angeles and State of California, have invented a new and useful Fluid-Packing Pump-Piston, of which the following is a specification.

This invention relates to improvements in certain respects of fluid packing pump pistons invented by me heretofore as exemplified in my allowed application for Letters Patent of the United States, Serial Number 545,752, filed Feb. 24, 1910, in which some of the features shown herein are shown and claimed and for that reason not claimed in this application.

An object of this invention is to provide a fluid packing pump piston in which compensation is made for relative movement between the packing and cage when the flexible packing is contracted and expanded by the lateral pressure of the fluid in the operation of raising and lowering the plunger, thus to maintain a perfect seal between the pump tubing and the packing at all times, and also to minimize the strains on the packing and to avoid liability of breaking the packing at its connections with the metal portions of the piston.

A further object of the invention is to provide supplemental packing below the principal packing to prevent sand reaching the principal packing and to insure uninterrupted operation of the pump in case the principal packing breaks at its connections.

Another object of the invention is the provision of a valve which is automatically rotated by the fluid while seating.

Further objects and advantages may appear in the subjoined detail description.

The accompanying drawings illustrate the invention.

Figure 1 is a fragmental elevation partly in mid-section of a pump piston built in accordance with this invention and in place in a pump tubing, fragments of which are shown in section. Fig. 2 is an enlarged longitudinal mid-section of some of the parts shown in Fig. 1. The valve is turned at an angle of ninety degrees from the position shown in Fig. 1. Fig. 3 is a cross section on line $x^3$, Fig. 2. Fig. 4 is a cross section on line $x^4$, Fig. 2. Fig. 5 is a cross section on line $x^5$, Fig. 2. Fig. 6 is a cross section on line $x^6$, Fig. 2. Fig. 7 is an enlarged fragmentary detail in vertical section of the construction below the piston valve. Fig. 8 is an end view of the lower packing tube detached. Fig. 9 is an elevation of the piston valve detached. Fig. 10 is an elevation of the piston on a reduced scale.

The pump tubing 1 is provided internally with a pump piston 2 comprising an axial connecting rod which may be solid or may be hollow to allow a passage for gas or other fluid. Such connecting rod 3 is screwed at one end into a cage 4 and screwed at the opposite end through a hollow internally threaded and counter-bored plug 5 which is adjustable on the rod and is preferably provided with a wrench seat 6 forming a flange that rests upon the upper end of a turn buckle 7 which is screwed onto a threaded portion 8 of the plug below the wrench seat.

Connection is made between the connecting rod and a sucker rod of any desired construction. In the form shown, such connection is the hollow plug 5 having a threaded portion 9 above the wrench seat 6 for connection with the sucker rod 10 which in the form shown is tubular.

The rod 3 is provided on its upper projecting end above the plug 5 with a check nut 11 so as to lock the plug relative to the rod and preserve the adjustment.

The turn buckle 7 is provided at its lower end with a screw-threaded seat 12 to engage with the internal threads of a union 13 which is provided with an annular groove 14 to engage the bent ends 15 of an annular collar 16 that is fixed in any suitable manner as by counter-sinks or indentations 17 to a main packing tube 18. The union 13 is preferably provided with external notches 19 to receive and further secure the end of the main packing tube. Said tube 18 is preferably of fibrous material such as yucca, and may be of any other suitable material as rubber and the like. Its lower end is fastened by means of an annular collar 20 of the same construction as the collar 16 to a union 21 preferably constructed like the union 13 and having screw-threaded engagement with one end of a hollow cylindrical sealing bushing 22, the other end of which has a sliding fit within a cylindrical extension 23 projecting up from the cage 4, the cage and sleeve thus being in slidable or telescopic realtion with one another. The sealing bushing 22 is provided internally with a cross bar 24 through which the lower end of the connecting rod 3 passes. It is thus seen that I have provided a pump piston comprising a cage, a packing tube and means movable independently of the cage connecting the packing tube to the cage; said means compensating for contraction and expansion of the tube irrespective of the cage.

The rod 3 is provided with a pair of spring seats 25, one of which rests against the plug 5 and the other against the bushing cross bar 24. The spring seats 25 are preferably tubular and project slightly inside the respective ends of the packing tube 18 to hold between them inside such tube a coil spring 26 that surrounds the rod 3 for the purpose of keeping the packing tube from buckling and collapsing. The spring seats 25 serve to maintain the spring within the limits of the packing tube 18 in order that the reduced passage beyond the ends of the packing tube will be unobstructed by the spring. The size of the passage through the packing tube adjacent the spring is maintained by the lateral pressure of the fluid within the passage.

The cage 4 comprises a cylindrical hollow body 27 having integral therewith a plurality of vertical ribs forming guides 28 the upper ends of which form cross arms 29 into which the rod 3 is screwed.

The rod 3 is provided on its lower end with an extension forming a guide pin 30 preferably tubular and of smaller diameter than the rod 3 so as to form a shoulder 31 to seat in the arm 29. The guide pin 30 projects into the cage body 27 below the arms 29 and through an axial perforation or guide-way 32 that communicates with a transverse perforation 33 in a valve 34 which normally rests on a valve seat 35 that is fastened within the body 27 below the ribs in any suitable manner. Preferably the valve seat is provided with an annular flange 36 held against a shoulder 37 within the cage body by the upper end of plunger barrel 38 screwed into a lower extension 39 of the cage.

The valve 34 is provided with deflecting wings 40, which are preferably radial and more or less aslant from the perpendicular so that, when the valve moves down onto its seat, the liquid beneath the slope of the wings will deflect the wings and thus rotate the valve. The valve wings 40 preferably terminate above in a curved tip 41 but it is understood that the deflecting surfaces may be arranged in any manner to get the rotating action on the valve.

The lower cage extension 39 is provided below the threaded portion with a shouldered portion 42 to receive between it and the plunger barrel 38, one end of a shouldered supplemental packing tube 43, which is provided on the other end with a shouldered annular inlet nut 44 that is screwed on the lower end of the plunger barrel so as to hold and seal the supplemental packing tube between the inlet nut and the extension 39 and between the pump tubing and the plunger barrel and permit of fluid entering the plunger barrel.

It is understood that either of the packing tubes 18 or 43 may be omitted if desired, and that both packing tubes may be made of the same or different materials, that they may be formed of a number of successive layers as clearly indicated in Fig. 8 and as shown described and claimed in my co-pending application for packing filed Jan. 10, 1911, Serial No. 601,877.

The threads of the connecting rod and of the threaded portion 8 of the plug are of the same pitch and the threads are cut into the rod 3 which fits the counter-bore of the plug.

To assemble the pump piston the spring seats 25 and the spring 26 are of less external diameter than the threaded portion 8 of the plug 5 so that they may be freely slipped through the orifice in the turn buckle through which the threaded portion 8 of the plug screws.

To assemble the parts the connecting rod 3 will be screwed into the cage; and the bushing, turn buckle, the packing sleeve and its connections are assembled together and slipped over the connecting rod bringing the bushing inside the cage extension 23. Then the spring seats and the spring in the order shown in Fig 2 will be slipped onto the rod and through the orifice in the turnbuckle. Then the plug 5 will be screwed home on the connecting rod into the turn-buckle and onto the upper spring seat 25, and the check nut 11 will be screwed home onto the connecting rod to prevent the parts from becoming loose. The spring 26 is of such length that when the plug is thus screwed home, appropriate tension is placed upon said spring to stretch the packing tube 18 as required.

I claim:—

1. A pump piston comprising a cage, valve means in the cage, a packing tube, means connecting the packing tube to and in telescopic relation with the cage, and compensating for contraction and expansion of the tube irrespective of the cage.

2. A pump piston comprising a cage, valve means in the cage, a packing tube, means connecting the packing tube to the cage and allowing for contraction and expansion of the tube relative to the cage; a spring to stretch the packing tube; and means to confine the spring within the limits of the packing tube.

3. In a pump piston, a packing tube, a cage, a cylindrical extension on the cage, and a bushing slidable in the extension and connected to the packing tube.

4. In a pump piston, a packing tube, a cage, means connecting the packing tube to the piston, an upper cylindrical extension on the cage, a bushing slidable in the upper extension and connected to the packing tube, a lower extension on the cage, a plunger barrel fastened at one end to the lower extension, an annular inlet nut connected to the other end of the plunger barrel, and a supplemental packing tube surrounding the plunger barrel between the lower extension of the cage and the inlet nut.

5. In a pump piston, a packing tube, a cage, a cylindrical extension on the cage, a bushing in slidable relation to the extension and connected to the packing tube, a cross bar in the bushing, a rod fastened at one end to the cage and sliding through the cross bar, and means fastening the other end of the rod to the packing tube.

6. In a pump piston, a packing tube, a cage, a cylindrical extension on the cage, a bushing connected to the packing tube and slidable in the extension, a cross bar in the bushing, a rod fastened at one end to the cage, means fastening the other end of the rod to the packing tube, and a spring surrounding the rod between the cross bar and the said fastening means.

7. In a pump piston, a packing tube, a cage, a cylindrical extension on the cage, a bushing connected to the packing tube and slidable in the extension, a cross bar in the bushing, a rod fastened at one end to the cage, means fastening the other end of the rod to the packing tube, a spring surrounding the rod between the cross bar and the said fastening means, and means to confine the spring within the limits of the packing tube.

8. In a pump piston, a packing tube, a cage, a cylindrical extension on the cage, a bushing connected to the packing tube and slidable in the extension, a cross bar in the bushing, a rod fastened at one end to the cage, means fastening the other end of the rod to the packing tube, and means to adjust the bushing relative to the cage.

9. In a pump piston; a connecting rod; a cage fastened to one end of the connecting rod; a plug screwed on the other end of the connecting rod and provided with an external wrench seat and with a threaded portion below the wrench seat, a turn buckle engaging said threaded portion and packing means fastened to the turn buckle and in slidable relation to the cage.

10. In a pump piston; a connecting rod; a cage fastened to one end of the connecting rod; a plug screwed on the other end of the connecting rod and provided with an external wrench seat and with a threaded portion below the wrench seat, a turn buckle engaging said threaded portion and packing means fastened to the turn buckle and in slidable relation to the cage and a check nut on the rod.

11. In a pump piston; a connecting rod; a packing tube; a sealing bushing fastened to the packing tube; a cage having a hollow cylindrical body; ribs projecting in from the body and terminating in radial arms to which the connecting rod is fastened; and a hollow cylindrical extension to the body above the arms to form a guide for the sealing bushing.

12. In a pump piston; a connecting rod; a packing tube; a sealing bushing fastened to the packing tube; a cage having a hollow cylindrical body; ribs projecting in from the body and terminating in radial arms to which the connecting rod is fastened; a hollow cylindrical extension to the body above the arms to form a guide for the sealing bushing; a valve seat in the cage below the ribs; and a hollow cylindrical extension to the body below the valve seat to form a seat for the packing tube.

13. In a pump piston; a connecting rod; a packing tube; a valve; a cage detachably connected to the connecting rod and having a hollow cylindrical body; ribs projecting in from the body and terminating in radial arms to which the connecting rod is fastened; and an extension to the connecting rod projecting into the body of the cage and into the valve.

14. In a pump piston; a connecting rod; a packing tube; a valve; a cage detachably connected to the connecting rod and having a hollow cylindrical body, ribs projecting in from the body and terminating in radial arms to which the connecting rod is fastened, and an extension to the connecting rod forming a shoulder in the arms and projecting into the body of the cage and into the valve.

15. A pump piston comprising a cage, valve means in the cage, a bushing in slidable relation to the cage, a packing tube fastened at one end to the bushing, a turn buckle fastened to the other end of the packing tube, a plug screwed through the turn buckle to connect with the sucker rod of a pump, and a connecting rod of smaller diameter than the tube fastened at one end to the cage and screwed through the plug at the other end.

16. A pump piston comprising a cage, valve means in the cage, a bushing in slidable relation to the cage, a packing tube fastened at one end to the bushing, a turn buckle fastened to the other end of the packing tube, a plug screwed through the turn buckle to connect with the sucker rod of a pump, a connecting rod of smaller diameter than the tube fastened at one end to the cage and screwed through the plug at the other end, and a spring surrounding the connecting rod between the bushing and the plug.

17. A pump piston comprising a cage; valve means in the cage; a bushing in slidable relation to the cage; a packing tube fastened at one end to the bushing; a turn buckle fastened to the other end of the packing tube; a plug screwed through the turn buckle to connect with the sucker rod of a pump; a connecting rod of smaller diameter than the tube fastened at one end to the cage and screwed through the plug at the other end; a pair of tubular spring seats surrounding the connecting rod, one of said seats having one end resting against the bushing and the other of said seats having one end resting against the plug and the pair of said seats having their other ends projecting within the limits of the packing tube; and a spring surrounding the rod between the spring seats.

18. A pump piston comprising a cage, valve means in the cage, a packing tube adapted to be pressed outwardly by the internal fluid, and telescopic means connecting the packing tube to the cage and compensating for elongation of the tube independently of the cage when so pressed outward.

19. A pump piston comprising a cage, packing means in slidable relation to the cage, a connecting rod fastened to the cage, and adjustable means connecting the connecting rod to the packing means.

20. A pump piston comprising a cage, packing means in slidable relation to the cage, a connecting rod fastened to the cage, and adjustable means connecting the connecting rod to the packing means and to the sucker rod of a pump.

21. A pump piston comprising a cage, valve means in the cage, a packing tube above the cage, means connecting the upper end of the packing tube to and in fixed relation to the cage, and means connecting the lower end of said packing tube to the cage and compensating for contraction and expansion of the tube independently of the cage.

22. A pump piston comprising a cage, valve means in the cage, a packing tube above the cage, adjustable means connecting the upper end of the packing tube to and in fixed relation to the cage, and means connecting the lower end of said packing tube to the cage and compensating for contraction and expansion of the tube independently of the cage.

In testimony whereof, I have hereunto set my hand at Los Angeles, California this 29th day of December 1910.

JOHN HAHN.

In presence of—
GEORGE H. HILES,
JAMES R. TOWNSEND.

---

Copies of this patent may be obtained for five cents each, by addressing the "Commissioner of Patents, Washington, D. C."